United States Patent [19]

Bradley

[11] 4,214,399
[45] Jul. 29, 1980

[54] ANIMAL TRAP

[76] Inventor: Ross Bradley, 3929 Porter Ave., Knoxville, Tenn. 37914

[21] Appl. No.: 970,976

[22] Filed: Dec. 20, 1978

[51] Int. Cl.² .............................................. A01K 69/06
[52] U.S. Cl. ...................................................... 43/66
[58] Field of Search .......................... 43/64, 65, 66, 67

[56] References Cited

U.S. PATENT DOCUMENTS

| 729,786 | 6/1903 | McDaniel | 43/66 |
| 1,231,501 | 6/1917 | Czeczel | 43/67 |
| 1,618,513 | 2/1927 | Coghill | 43/66 |

Primary Examiner—Harold D. Whitehead

[57] ABSTRACT

Apparatus for trapping rodents or other parasitic animals is disclosed. The apparatus is inexpensive to manufacture and includes unique features which add to the efficiency while at the same time reducing the danger to children or pets from the action of the trap apparatus or the trapped and vicious animal. The apparatus includes a cylindrical container or drum which lays on its side and is open on at least one end. Rails or feet are welded to the outside of the drum for purposes of maintaining the drum in a selected position. A close-fitting end piece which can be secured to the open end of the drum includes a heavy wire mesh basket attached thereto so that the wire mesh basket is inside the drum when the end piece is in place. A passage through the end piece connects the interior of the basket to the outside. Located in the passage is a one-way control device which will allow the animal to enter the basket from the outside but will not allow passage from the basket to the outside. Bait or other food attractive to the animal is located within the drum, but not within the basket itself. Thus, the bait or food is never consumed and must only be changed or renewed when it becomes ineffective. Once an animal is trapped, the basket-end-piece combination is simply removed from the drum with the trapped animal and replaced with an unoccupied basket. The trapped animal may then easily be exterminated such as by drowning.

10 Claims, 5 Drawing Figures

ANIMAL TRAP

BACKGROUND OF THE INVENTION

This invention relates to the trapping of live animals and more particularly to the trapping of rats, rodents and other parasitic animals by apparatus which is inexpensive to manufacture, does not require recharging of the bait, and does not terrify the trapped animal such that it provides warnings to its companions to stay away from the trap. Communities having a large population density are contiuously faced with the severe danger of rat infestation. Consequently, each year many children, pets and even adults receive serious bites and are exposed to other serious health problems brought on by the presence of the rats.

It is well known that man has tried throughout history to find an effective and safe way to eliminate this serious health problem. Unfortunately, it is also well known that rats seem to possess the unique capability of adjusting to and then avoiding various traps as well as becoming immune to many poisons. At the same time the more effective poisons and traps also seem to pose serious dangers to pets and children. The present invention provides trapping apparatus which is very inexpensive to manufacture, is completely safe with respect to children and most all pets, and seems to have solved the problem of rats learning to live with the device without being captured. In addition, according to this invention, trapped rats may be exterminated without handling either the live or dead animals.

U.S. Pat. No. 3,872,619 issued to Ivy McIlwain on Mar. 25, 1975, discloses a trap system which includes a first container inside a second container. This trap, however, does not include many of the features of the present invention. For example, the trapped animal has access to the food or bait contained therein and therefore each time a rat is trapped the bait must be renewed. In addition, the trapped animal once inside the trap immediately becomes aware of its entrapped situation and it is believed at this time sets up some unknown communication to its companions to avoid the trap. In addition, the McIlwain apparatus also requires that the device be buried in the ground and that a tunnel or entry be dug in the ground. The extra effort of installing this apparatus, dramatically increases cost and consequently reduces its effectivity.

U.S. Pat. No. 2,193,937 issued to F. Pirani et al. on Mar. 19, 1940, discloses a two-compartment trapping device. An animal is first enticed into the first compartment in order to obtain bait or food and then proceeds into a second compartment in trying to escape. This trap although useful for the disposal of animals which might be trapped, also includes many of the shortcomings of the McIlwain apparatus. For example, the bait or food is accessible to the animal and will be consumed and therefore must be replenished, the animal consumes the food and quickly becomes aware of its entrapped condition and is able to warn its companions. Finally, and perhaps most importantly, trapped animals are visable to the outside and thus, attractive to small children and pets. Continued tampering by small children or pets would have the likely result that the animal will escape and inflict a serious wound to the child or pet.

U.S. Pat. No. 956,138 issued to E. H. McAleer on Apr. 26, 1910, provides a trap made from a two-section drum set vertically. The top section of the drum provides a passageway into the confining section. In this apparatus, the bait or food is not accessible by the animal; however, upon being trapped the animal is immediately aware of its entrapped status and will try to get away and will set up a warning to its companions. In addition, this trap does not provide for the easy disposal or extermination of the animal such as by drowning. This trap also is susceptible to the animal escaping while removing the animal from the trap, since it is not a simple process of simply moving a basket if an animal is trapped. According to this device, the containing or confining section of the trap is the drum itself.

Finally, U.S. Pat. No. 748,201 issued to B. F. D. Miller on Dec. 29, 1903, discloses a very simple trapping apparatus which includes an open cylinder which may be steel, tile, etc. A truncated cone made out of sharpened wires is snapped on both ends such that the animal may enter the cylinder but is prevented from leaving because of the sharpened wires. This trap suffers from the disadvantages of the bait being consumed by the trapped animal, other animals quickly becoming aware of the desperate situation of the trapped animal, and the danger of disposing of the live animal once entrapped in the device.

Thus, as will become apparent hereinafter, although many types of animal traps are available, none of them include the many unique features of the present invention.

To overcome the shortcomings of these and other available methods discussed above, with respect to presently available traps, it is an object of this invention to provide an effective, inexpensive and easily manufactured live animal trap which does not endanger children or pets.

It is another object of the present invention to provide an animal trap which does not allow the trapped animal to consume the bait or food.

A further object of the present invention is to provide a rat trap which avoids terrifying the trapped animal such that it warns its companions.

It is also an object of this invention to provide means of exterminating the trapped animal without handling either the live or dead animal.

To accomplish the above mentioned objects as well as other objects which will become evident from the following drawings and detailed description, the present invention provides a device for trapping a multiplicity of live animals such as rats without terrifying the animal such that it warns its companions. The device comprises a horizontally positioned cylindrical outer housing made of a material capable of withstanding the gnawing of entrapped animals and having at least one open end. A disc suitable for securing to and covering the open end of said cylinder housing defines an aperture suitable for the passage of animals of the type being trapped. A basket made of a perforated material capable of withstanding the gnawing of an entrapped animal is secured to said cover disc such that the aperture in said cover disc opens to the interior of said basket. A one-way passage device is attached to said cover disc such that an animal lead by the bait through said aperture and one-way passage to the interior of said basket is trapped and yet is out of reach of any bait placed in said outer housing.

DESCRIPTION OF THE INVENTION

Figure 1:
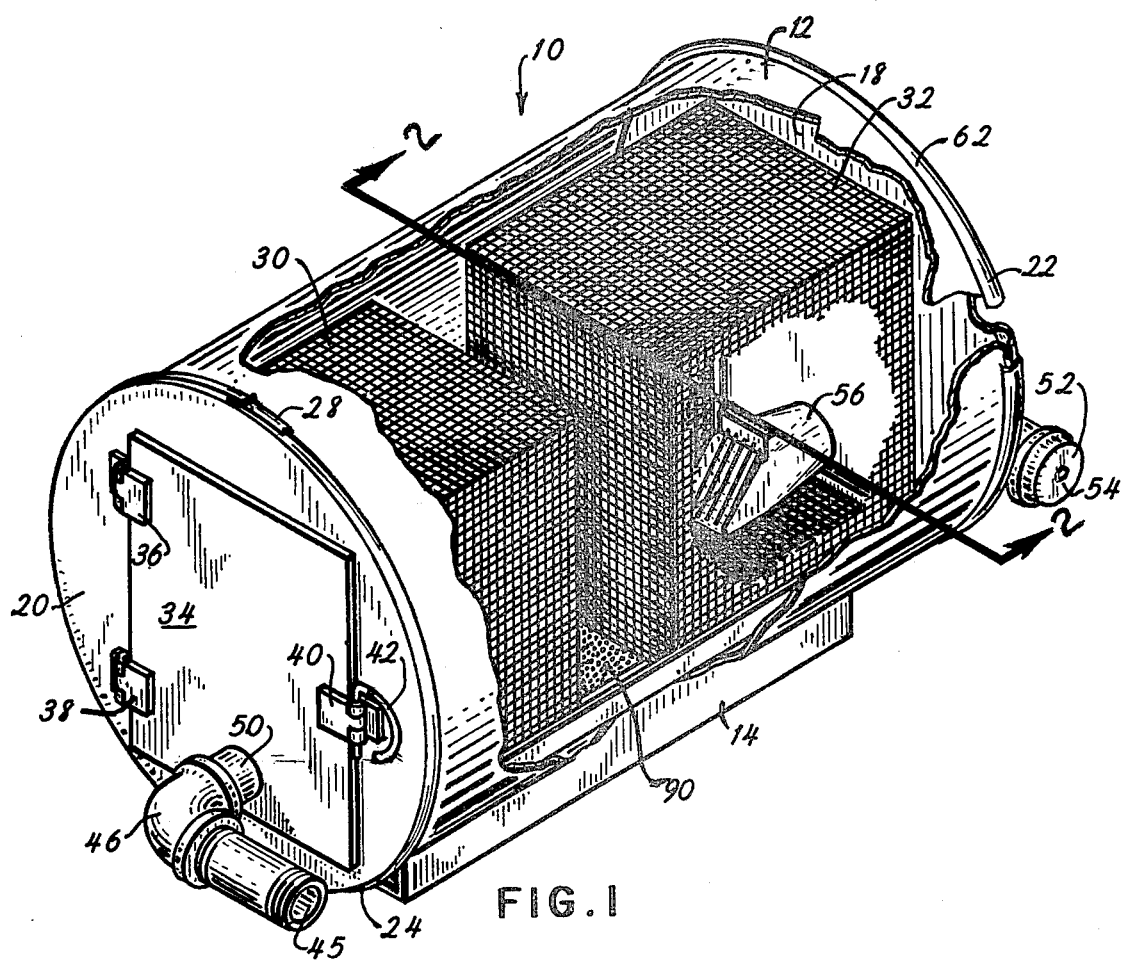
FIG. 1 is a break-away pictorial presentation of one embodiment of the present invention.
Figure 2:
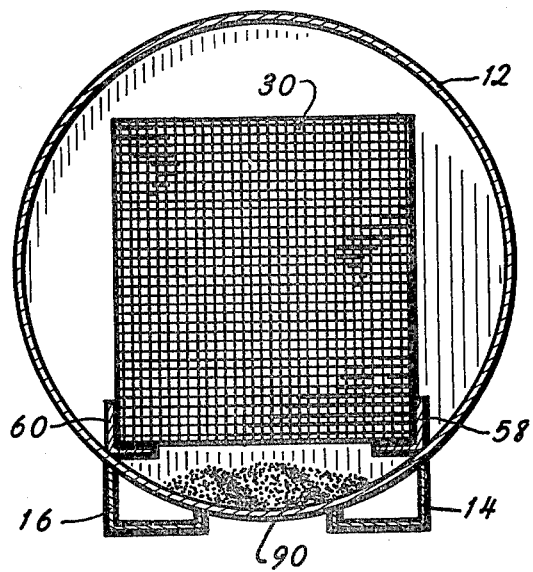
FIG. 2 is a cross-sectional view of the embodiment shown in FIG. 1.

Referring now to FIG. 1, there is shown generally at 10 a first embodiment of the present invention. According to this embodiment, there is a cylindrical container 12 such as for example an oil drum or the like made of a sturdy material such as metal or steel which is capable of withstanding the gnawing of a entrapped rodent. Foot members 14 and 16 which are more clearly shown in FIG. 2, are firmly attached to drum 10 such as by welding, and thereby maintain the drum in a selected position. Secured to each end of drum 12 two disc-shaped covers 18 and 20. Cover discs 18 and 20 are secured to drum 12 by means of latching bands 22 and 24. It will be appreciated that latching bands 22 and 24 are standard commercially available type bands and generally include latches 26 and 28 which may be secured by a padlock.

Figure 3:
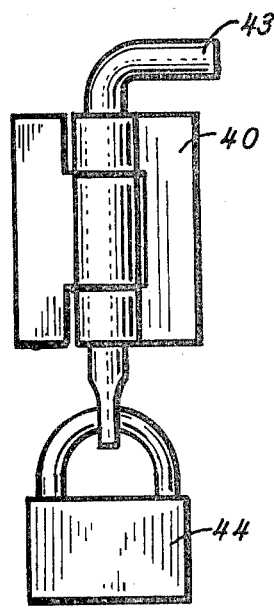
FIG. 3 shows an alternate technique of locking the removal door.

According to the embodiment shown in FIG. 1, secured to the ends disc 18 and 20 are two wire mesh baskets 30 and 32. These baskets are also made of material sufficiently strong enough to withstand the gnawing of a entrapped rodent. In the embodiment shown in FIG. 1, baskets 30 and 32 are shown to be cubed shaped, however, it will be appreciated that the baskets could be short cylindrical baskets attached to the disc covers 18 and 20. In the embodiment shown, five of the sides of the cube baskets 30 and 32 are made out of the wire mesh, whereas the sixth side is the side securely mounted against cover disc 18 and 20. It will also be appreciated by those skilled in the art, that in addition to using a wire mesh type basket, any sort of perforated material or other strong material which can withstand the gnawing of the entrapped rodent may be used. Also, as is shown in FIG. 1 and more clearly in FIG. 2, support rails 58 and 60 are permanently secured to the inside of drum 12 such that they provide support to cages 30 and 32 when these wire mesh baskets are in place. In the embodiment shown in FIG. 1, there is a door 34 secured to cover disc 20 by means of hinges 36 and 38. In the closed position, door 34 is secured to disc cover 20 by means of a hasp 40 and locking D-ring 42. When the door 34 is swung open on hinges 36 and 38, it provides a large passage between the outside and the inside of wire mesh cage 30. As can be seen, if any rodents or animals were trapped in cage 30 they could be easily removed by means of door 34. It will also be noted that for safety purposes drop rod 43 using a padlock 44 as shown in FIG. 3 may be used with hasp 40 to secure door 34 in the closed position. Securing the door in this manner is especially important in those circumstances where small children or animals might have access to the rodent trap. A passageway 45 is provided from the outside through door 34 to the interior of cage 30. Passageway 45 in the embodiment shown comprises a tubular passageway having a right angle section 46, a straight section 48 attached to the cover disc 20 and another straight section 50 secured to the right angled section 46. This passageway is secured to an aperture (not shown) in door 34 such that the interior of the right angular tubular passageway 45 provides access to the interior of cage 30. In the embodiment shown, standard and commercially available iron piping may be used. It will also be appreciated that the size or diameter of the piping used may vary depending upon size of the rodent or animal to be entrapped. It is anticipated that in some events the size of the pipe may even be up to six inches inside diameter. Also provided for reasons that will be explained in more detail hereinafter, is a cap 52 having an aperture 54 therethrough which fits over the end of passageway 45. Inside of baskets 30 or 32 at the point where passageway 45 terminates is a one-way-passage limitation device 56. It will be appreciated that any type of device which will allow movement of the rodent in only one direction may be used. A particularly effective one-way device is disclosed in FIG. 5 and will be discussed hereinafter.

Figure 4:
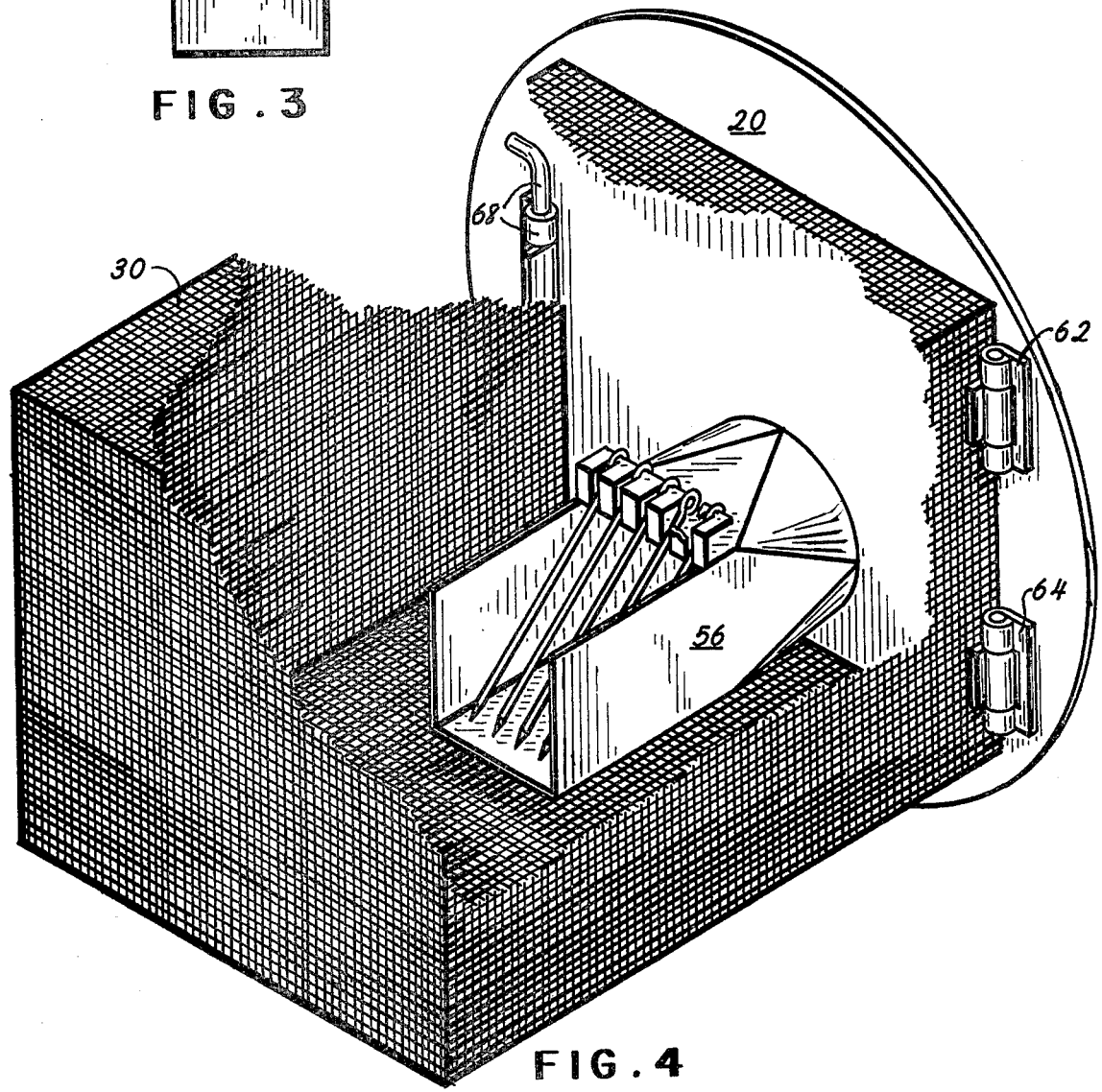
FIG. 4 shows an alternate technique of removing the entrapped animals.

Referring now to FIG. 4, there is shown an alternate embodiment for attaching the wire mesh cage 30 to cover disc 20 to provide a means for removing the entrapped animal. Thus, it is seen, from the back side of cover disc 20 one-way passage limiting device 56 is still in place such that animal entering therethrough is entrapped inside of cage 30. According to this embodiment rather than providing a hinged door 34 as part of cover disc 20, basket 30 itself is secured to cover plate 20 by means of hinges 62 and 64. In addition, hasp 66 and drop pin 68 will secure the cover disc 20 tightly up against the open side of wire mesh cage 30 to completely entrap the animal. Thus, according to this embodiment, the entrapped animal is simply removed by lifting latch pin 68 and swinging cage 30 on its hinges 62 and 64 to the open position. This arrangement is particularly suitable in areas where small children may have access to the trap as it prevents them from reaching the entrapped animal.

Figure 5:
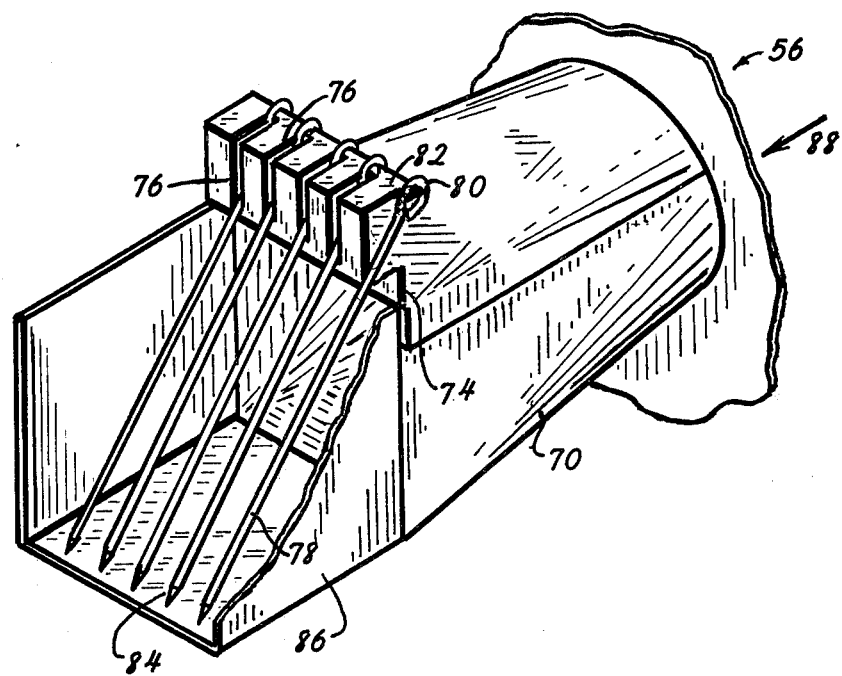
FIG. 5 shows a detailed embodiment of a passageway device which allows travel in only one direction.

Referring now to FIG. 5, there is shown in more detail the one-way passage limiting device 56. In the example shown in FIG. 5, two pieces of sheet metal 70 and 72 are formed to provide the one-way passage. End 74 of sheet metal 72 is provided with slots 76 and formed to provide guideways for sharpened spikes 78. Sharpened spikes 78 include an eye end 80 which fits loosely over support rod 82. Support rod 82 is securely attached to the slotted end 74 of sheet metal 72. Thus, it can be seen that the sharpened spikes 78 rotate around support rod 82 as they are maintained in position by guide slots 76. Thus, the weight of spikes 78 maintain the sharpened ends 84 against end 86 of sheet metal 70. It can be seen, therefore, that an animal may enter the device 56 in the direction shown by arrow 88. The animal may also push passed sharpened spikes 78 and thus lift them up out of the way and thus enter totally to the interior of cage 32. However, once inside the sharpened rods 78 fall back into place and provide a barrier against the animal returning from the direction it came. In addition, in the event the animal gets part way pass sharpened rod 78 it is prevented from backing out of the container. This is achieved by the fact that if the animal tries to reverse its direction, the points 84 of sharpened spikes 78 will dig into its flesh and prevent travel in the wrong direction. Thus, the animal is encouraged to continue its travel to the interior of the cage 30 and 32 and thus becoming entrapped.

It will be appreciated that a very inexpensive and very effective technique for trapping rodents and other parasitic animals has been provided. It will also be noted, that the device may be inexpensively manufactured from sheet metal, old oil drums and standard commercial piping. Furthermore, as will become apparent in the discussion on the operation of the present trap it will be seen that device does not even allow the entrapped animal to consume the bait and thereby provides additional savings.

In operation, the device is set in a location infested by rodents or other parasitic animals. Bait 90 as shown in FIG. 2 and FIG. 1 is included inside the drum between rails 58 and 60. Cover discs 20 and 18 with their respective cages 30 and 32 secured thereto are inserted in both ends of drum 12. It will be appreciated that in the embodiment shown two cages, two disc ends and two entry ways are shown. However, it is intended to be within the scope of this invention to include an embodiment whereby one end of the drum may be securely sealed and only one basket and passageway included. The baskets and their disc covers are secured to the drum such that children or small animals may not detach the cover disc from the drum. In addition, door 34 is securely closed against cover disc 20. In operation, a rodent attracted by the smell of the bait 90 will search out its source. In the searching process, the rodent will recognize that the bait may be reached by way of passageway 45. Thus, the animal will enter passageway 45 and proceed passed one way limiting device 56 to the interior of cage 30 or 32. It will also be appreciated that in the described embodiment the right angle provided for passageway 45 will prevent a small child from sticking his arm and hand through the interior of cage 30 and pass limiting device 56 where a hand might easily become impaled on spikes 84 or exposed to attack by the entrapped rodent. Typically, the animal travelling through passageway 44 will not be disturbed as it passes sharpened spikes 78 and will continue to the interior of cage 30 or 32. Once inside the cage 30 or 32, it is believed that in most instances the animal will continue to try to reach the bait on the other side of the mesh wire cage. Thus, during this process the animal will not discourage the arrival of additional rodents. It is believed, therefore, that a large number of rodents may be entrapped within cage 30 or 32 or both, before any of the animals become aware that they are entrapped.

The entrapped animals can readily be removed for either laboratory purposes or disposal purposes by simply unlatching the securing band 28 from around cover disc 20 and drum 12. Once the band is removed, the cage and cover disc may be carried by means of the pipe providing passageway 44 as desired. A similar cage and cover disc may then be inserted in its place and make use of the existing bait still contained within drum 12.

Prior to removal of securing band 28, cap 52 having aperture 54 therein, is secured to the end of passageway 45. This insures the trapping of any animal that might possibly be in passageway 45, but which has not as yet proceeded passed one-way device 56. Thus, the entrapped animals may be carried by means of the piping which acts as a handle to a desired location such as for example a drowning pond. The cage along with the cover disc may then be immersed under water until the animals have then been destroyed. It will be seen, that the aperture 54 provides passage of air out of the passageway 45 which air might have been trapped within passageway 45 and provided a means for some of the animals to survive. However, with aperture 54, passageway 45 will also be completely filled with water assuring the destruction of the rodents.

Thus, although the present invention has been described with respect to specific embodiments it is not intended that such specific embodiments be considered limitations upon the scope of the invention except as is set forth in the following claims.

What is claimed is:

1. A device for trapping a multiplicity of live animals without terrifying said animals comprising:
   a horizontally positioned cylindrical outer housing made of a material capable of withstanding the gnawing of entrapped animals, said housing having at least one opened end and suitable for placing bait therein;
   a cover disc suitable for securing to and covering said open end, said cover disc defining an aperture therethrough suitable for the passage of an animal of the type being trapped;
   a basket made of a material capable of withstanding the gnawing of entrapped animals, said basket having a multiplicity of perforations which will allow the passage of air and odors therethrough but which perforations are too small for the entrapped animal to pass through, said basket further being securely attached to said cover disc such that said aperture through said cover disc opens to the interior of said basket; and
   a one-way passage device attached to said cover disc such that an animal lured by the odor of bait passing through said aperture in said cover disc must also pass through said one-way passage device to reach the interior of said basket thereby resulting in the animal being entrapped in said basket and out of reach of bait placed in said outer housing.

2. The trapping device of claim 1 and further comprising rails attached to the interior of said cylindrical outer housing for supporting said basket.

3. The trapping device of claim 1 and further including foot means attached to the exterior of said cylindrical outer housing for maintaining said cylinder in a selected position.

4. The trapping device of claim 1 and further including means for defining a passageway, said passage defining means being secured to the outside of said cover disc and surrounding said aperture such that an animal traversing said passageway may pass through said aperture in said cover disc, said passage defining means being of a sufficient length and also including an angle such that a child's hand and arm may not reach said aperture by means of said passageway.

5. The trapping device of claim 4 wherein said passageway is made from commercial pipe.

6. The trapping device of claim 4 and further including a cap suitable for covering the unsecured end of said passage defining means.

7. The apparatus of claim 1 wherein said cylinder housing is a 55 gallon oil drum.

8. The trapping device of claim 1 wherein said one-way passage device includes a plurality of sharpened spikes hinged such that an animal may pass in one direction but will be impaled if it attempts to reverse its direction of travel.

9. The trapping device of claim 1 and further comprising a door in said cover disc for providing additional access to the interior of said basket.

10. The trapping device of claim 1 wherein said basket is hingedly attached to said cover disc to provide an additional access to the interior of said basket.

* * * * *